(No Model.)

J. NELSON & L. P. LARSON.
HOG TROUGH.

No. 325,690. Patented Sept. 8, 1885.

Witnesses
Saml R. Turner
R. W. Bishop.

Inventors
James Nelson
Larito P. Larson
By R. S. & A. P. Lacey
Attys.

UNITED STATES PATENT OFFICE.

JAMES NELSON AND LARITS P. LARSON, OF CONCORDIA, KANSAS.

HOG-TROUGH.

SPECIFICATION forming part of Letters Patent No. 325,690, dated September 8, 1885.

Application filed April 30, 1885. (No model.)

*To all whom it may concern:*

Be it known that we, JAMES NELSON and LARITS P. LARSON, citizens of the United States, residing at Concordia, in the county of Cloud and State of Kansas, have invented certain new and useful Improvements in Hog-Troughs; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to improvements in feed-troughs, and is especially adapted for use in feeding hogs.

It has for its object to provide a combined water and feed trough, by which the hogs will be prevented from scattering the feed, and by which they can be easily watered and fed. These objects we attain by the construction, combination, and arrangement of the several parts, as will be hereinafter described and claimed.

Figure 1:
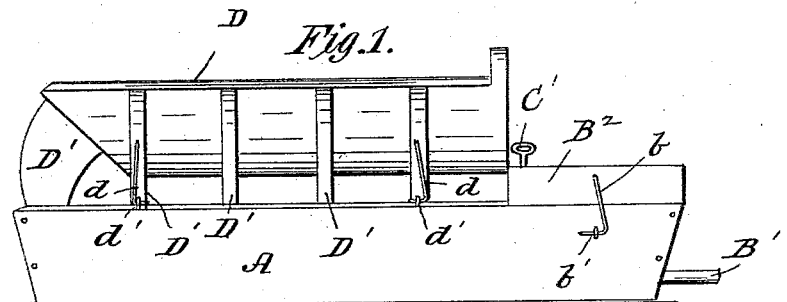
Figure 2:
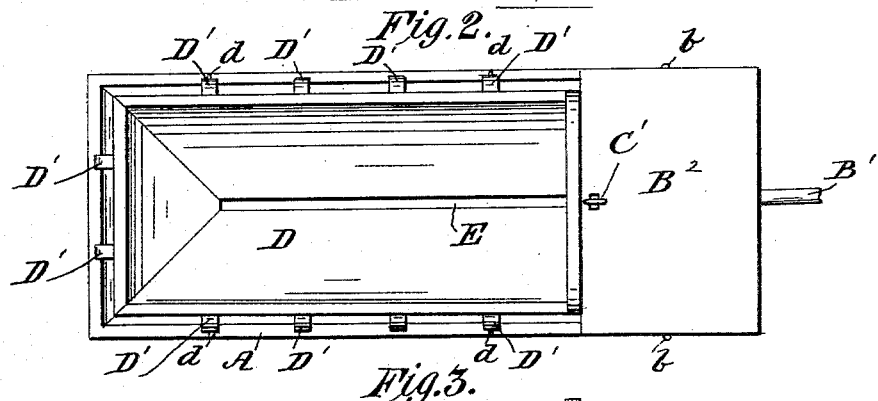
Figure 3:
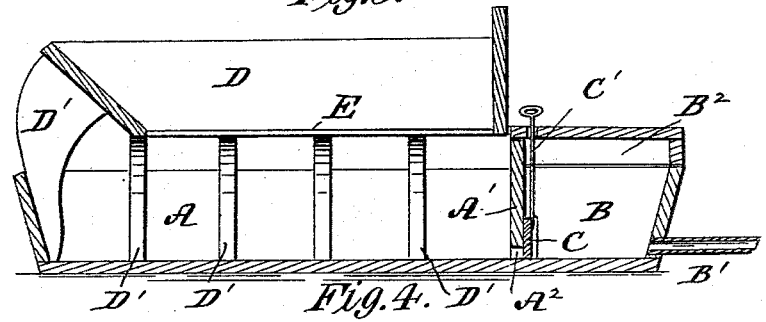
Figure 4:
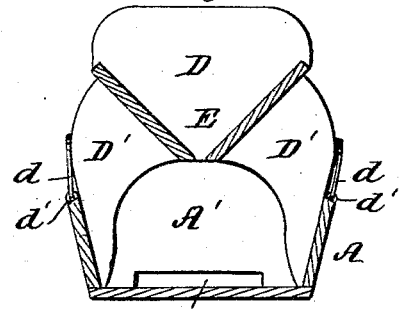

In the drawings, Figure 1 is a side elevation of our device. Fig. 2 is a plan view. Fig. 3 is a longitudinal vertical section, and Fig. 4 is a vertical cross-section of the same.

A is the trough, made preferably of the rectangular shape shown, although it could be made in any other suitable shape without departing from the principles of our invention. Near one end of the trough we place a partition, A', which separates the feed-trough from the water-tank. The lower end of this partition is provided with an opening, A², through which water passes from the tank into the feed-trough.

B is the water-tank. The water enters the tank through the pipe B', which is connected to a reservoir or cistern. A cover, B², is placed over the tank and removably secured thereon by hooks b, which engage staples b'. Within the tank B, and bearing close against the partition A', we place a valve-gate, C, which is operated by a rod, C', which passes through a suitable opening in the tank-cover. Where so desired, this rod C' could be made shorter and its upper end attached to a float, so as to operate automatically.

D is the hopper, supported over the feed-trough by the legs D', placed at regular intervals along all its sides, except the one next the tank B. To aid in holding the hopper, we provide two of the legs D' with hooks d, which engage staples d', placed along the upper edge of sides of the feed-trough. It will be understood that all of the legs D' could be provided with these hooks d, if so desired. The hopper is constructed with one vertical and one oblique short side, and two long oblique sides, the short vertical side being placed next the water-tank. The two long sides are held apart at their lower edges, so as to leave an opening, E, through which the feed passes into the trough.

We have shown the hopper as removable; but it will be understood that it could be rigidly secured in place, if so desired.

In use the feed is placed in the hopper and passes through the opening E into the feed-trough. The hogs eat the feed directly from the trough through the stalls formed by the legs D'. The legs D' are placed just far enough apart to admit the head of the hog. The hogs are thus prevented from getting into the trough with their feet and scattering the feed. When it is desired to water the hogs, the slide-gate C is raised and the water enters the trough through the opening A² in the partition A'.

When it is desired to clean the trough, the hopper and tank-cover are removed, when the trough and tank can be readily cleaned. It will also be seen that the tank and trough can be readily cleaned independently of each other.

Where so desired the water-tank can be dispensed with and the hopper and feed-trough used alone.

We are aware that feed-troughs have been provided with hoppers supported thereover on legs, which latter form stalls, and do not claim such as our invention, from which it differs in details of construction, as specifically indicated in the claim.

Having thus described our invention, what we claim, and desire to secure by Letters Patent, is—

The herein-described feeding device, consisting of the trough partitioned near one end to form a water-chamber, a passage leading therefrom to the trough, a valve controlling said passage, and a hopper supported over said trough on legs which form stalls, the parts being constructed, arranged, and operating substantially as shown and described.

In testimony whereof we affix our signatures in presence of two witnesses.

JAMES NELSON.
LARITS P. LARSON.

Witnesses:
 JOHN O. HANSON,
 G. PETTERSON.